Aug. 11, 1936.        W. A. DOREY ET AL        2,050,429
LIGHT MIXING APPARATUS
Filed July 1, 1932        2 Sheets-Sheet 1

INVENTORS.
William A. Dorey &
Thomas W. Rolph
BY
ATTORNEY.

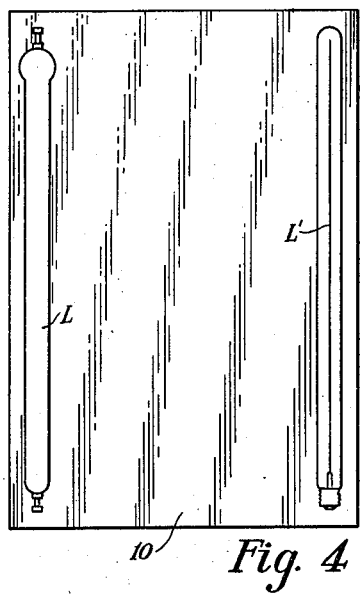
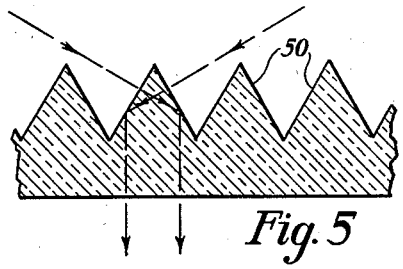
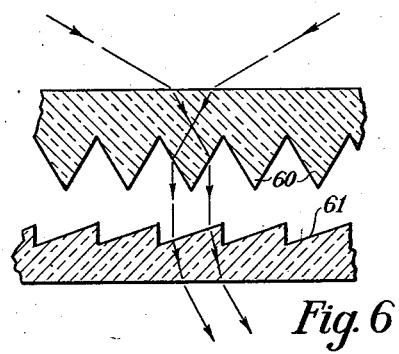
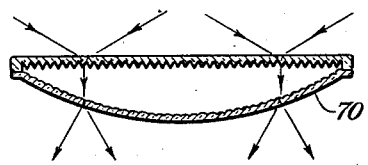
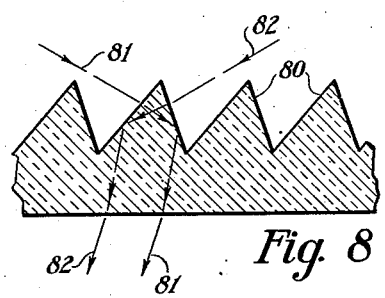
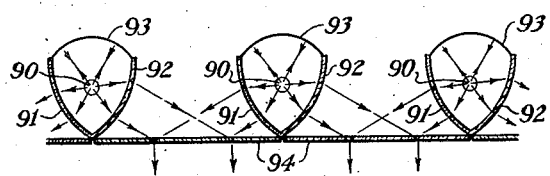

Patented Aug. 11, 1936

2,050,429

UNITED STATES PATENT OFFICE 2,050,429

LIGHT MIXING APPARATUS

William A. Dorey and Thomas W. Rolph, Newark, Ohio, assignors to Holophane Company, Inc., New York, N. Y., a corporation of Delaware Application July 1, 1932, Serial No. 620,323

14 Claims. (Cl. 240—11.4)

The present invention relates to light mixing apparatus adapted for combining the light from a plurality of sources and mixing and directing the same. It is directed toward apparatus adapted to redirect the light from two (or more) spaced light sources so that it is mixed or combined in a single beam, and is more particularly directed toward apparatus arranged to employ two (or more) light sources of the rectilinear type, and usually of unlike character, color, or operating characteristics. In certain constructions coming under this invention, the light flux from the two or more light sources is redirected by reflecting or refracting means or by both such means inside the apparatus so that the light emerges from the apparatus mixed or combined. In other forms of construction, the light from the two or more sources is redirected by reflecting or refracting or both means inside the apparatus so as to fall upon a prismatic plate or trough in a mixed or combined state, the function of the prismatic plate or trough being either to diffuse the light or to redirect the light so that any desired light distribution is obtained or to accomplish both these purposes. In still other forms of this apparatus the light is redirected by reflection or refraction within the apparatus but is not mixed until it strikes a prismatic plate or other prismatic surface carrying prisms which are capable of receiving light from two different directions and emitting light in a single direction, thereby mixing or combining the light flux from the two different light sources and, when these light sources are of different color, producing a mixture of the colors.

In certain constructions the usual forms of incandescent or other lamps having approximately point sources may be used while in other cases, for which the apparatus is particularly valuable, rectilinear light sources may be used.

Illustrative examples of rectilinear light sources which may be employed include incandescent lamps with rectilinear filaments, gaseous electrical glow tubes, neon tubes, mercury vapor lamps, and a linearly arranged series of closely spaced, approximately point source lamps.

Where unlike light sources are employed, the present invention contemplates apparatus for mixing and combining the rays from the sources so that the emitted light is mixed. The same apparatus is effective, where like light sources are employed, for obtaining substantially the same light distribution from a single piece of apparatus irrespective of whether one light source is burning, or both.

Considered broadly, the color mixing function may be accomplished in two ways, either by mixing the light by means of a reflecting surface which directs light from each light source through the other source so that the direct and reflected light is combined at each source, or it may be accomplished by a plate, one side of which accepts light from both sources (either direct or under the control of refractors and/or reflectors) and having prisms to act on the light so that it is emitted from the other side of the plate in the form of a mixed beam. Where parallel prisms only are used, the mixed beam would be made up of rays which, in a transverse plane at right angles to the prisms are substantially parallel to the axis of the optical train. Prismatic or other means may be employed for offsetting the light beam so that it is not parallel to this axis.

Where the light mixing is accomplished by reflection only, the invention contemplates the use of a reflector form of elliptical cross section and adapted to accept light from either or both sources at the foci, and to redirect it into a common beam.

Where the light to be mixed by the plate is partly direct light from each source and partly reflected light from each source, one may employ a trough-like reflector of parabolic cross section back of each light source for projecting a beam of parallel reflected rays obliquely toward the prismatic member. It receives these crossed rays of reflected light together with the direct light and transmits them in a single mixed beam with the predominant rays substantially parallel. The diverging direct light is more widely scattered and not so completely mixed. The laterally divergent rays (both direct and reflected) are condensed toward the plane of the predominant beam, but allowed to spread widely in planes at right angles thereto.

Where the light is to be directed onto the prismatic plate or trough by reflection and refraction, each light source is associated with a rectilinear reflector of circular cross section and a rectilinear lens adapted to receive a large solid angle of light (both direct and reflected) and condense the predominant rays into an oblique beam of substantially parallel rays, there being lateral divergence as above mentioned. In order to reduce the loss of efficiency due to the reflected rays passing directly through the light source, the specular reflecting material of the reflector may be slightly corrugated or rippled, the light source moved a trifle out of focus, or the material of the reflector may be slightly matte in finish. The plate or trough receives these crossed rays of light and transmits them in a single mixed beam with the predominant rays substantially parallel. Where it is desired to supplement the refracted light by reflected light, the angle subtended by the refractor is altered so that some light may escape without refraction and be intercepted by a reflector form which redirects it toward the plate or trough.

The light reflecting and/or refracting means, with associated incandescent lamp (or lamps), glow tube, vapor lamp, or the like, act as a long light source for the prismatic plate or trough. The prismatic plates or troughs are so placed relative to these long light sources as to intercept all the light and close the mouth or opening of the apparatus. They have prisms extending length-wise and adapted to refract or reflect and concentrate the rays received from either or both light sources into a beam such as described. The plate in its simplest form is flat, but it may be transversely troughed so as to increase the light collecting efficiency. It may also be made up of short flat portions arranged zig-zag longitudinally to minimize loss due to surface reflections of the laterally divergent rays.

Prismatic plates and troughs have the advantage over coverings of clear, etched, flashed, opal, ribbed, or pebble glass, in that the light distribution from the same may be varied over wide ranges. It also permits perfect mixing of the light and avoids producing multi-colored shadows where the light sources used have different spectral ranges. The mixed light may be further operated upon by placing an additional glass plate or trough of suitable optical characteristics outside the prismatic light mixing member to modify the distribution.

Where color mixing is not to be accomplished, only one type of light source need be used, but where color mixing or blending is desired one may select any two types of light source and arrange them in the proper relation with the reflecting and/or refracting means and prismatic plate or trough, where the latter is employed.

The accompanying drawings show, for the purpose of illustrating the invention, several of the many possible embodiments in which the present invention may take form, it being understood that the drawings are illustrative of the invention rather than limiting the same. In these drawings:

Fig. 4 is a diagrammatic plan view of a light mixing plate and two rectilinear light sources;

Figs. 5 and 6 are diagrammatic sectional views taken in a plane at right angles to the lamp axes and illustrating two forms of light mixing plates, Fig. 6 also showing the use of a supplemental prismatic member for altering the distributions of the mixed beam;

Fig. 7 is a diagrammatic sectional view taken in a plane at right angles to the lamp axes and illustrating a diffusing glass plate for use in conjunction with the light mixing plate;

Fig. 8 illustrates the use of tipped or additional prisms on the smooth side for asymmetrically offsetting the beam; and Fig. 9 is a diagrammatic view illustrating a sky light construction.

Figure 1:
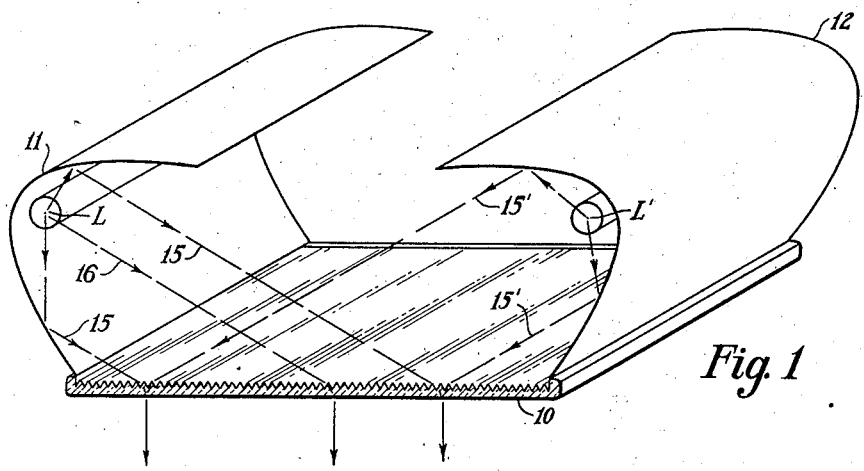
Fig. 1 is a transverse sectional view through a light mixing apparatus employing parabolic reflectors and a light mixing plate.

Fig. 1 shows a light mixing apparatus having a prismatic member, such as a long, flat, prismatic plate 10, two cylindrical reflectors 11 and 12, of parabolic cross section and arranged with their axial planes oblique to the plane of the plate, and two rectilinear light sources L and L' extending along the foci of the corresponding parabolic reflectors. The reflected rays 15 and 15' from the reflectors are parallel with the axial planes of the reflectors and strike the plane of the plate 10 at a uniform angle. Some of the direct rays 16 strike the plate at this angle or approximately this angle, the other rays diverge. The prismatic glass light mixing member (which will be described in detail below) intercepts the two unidirectional light beams from the reflectors in the region in which they cross and by refraction causes the predominant rays to mix and emerge from the lower side in a common direction.

Figure 2:
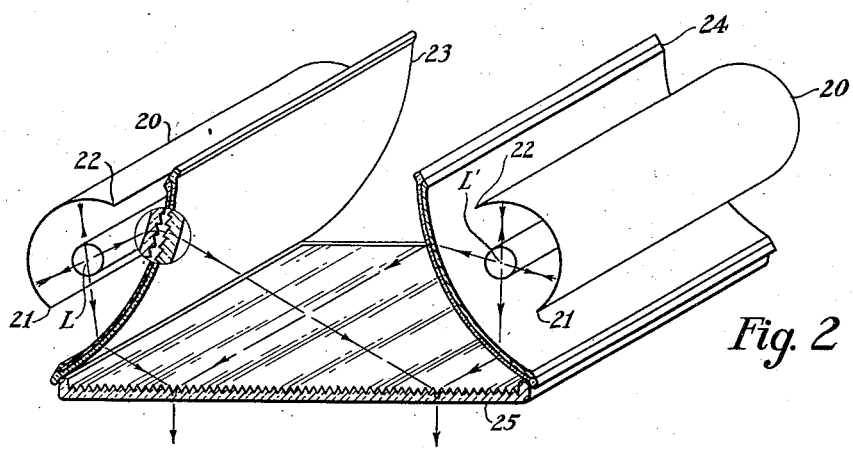
Fig. 2 is a transverse sectional view illustrating a light mixing apparatus employing two circular cylindrical reflectors and two collecting lenses and a light mixing plate.

In the form shown in Fig. 2, the projector or mixer is made up of two circular cylindrical reflectors 20 with centers of curvature at the rectilinear light sources L and L'. The reflectors 20 have openings of approximately 150° from points 21 to 22 but may extend to 180°. Flat or trough shaped two-piece prismatic lenses 23 and 24 receive the direct and reflected light from the lamps L and L' respectively and by refraction emit the predominant light rays from the underside in substantially flat, parallel beams. The prismatic glass mixing plate 25 intercepts the predominant rays of two unidirectional light beams from lens plates 23 and 24 and by reflection causes these rays to mix and emerge from the lower side in a common direction.

Figure 3:
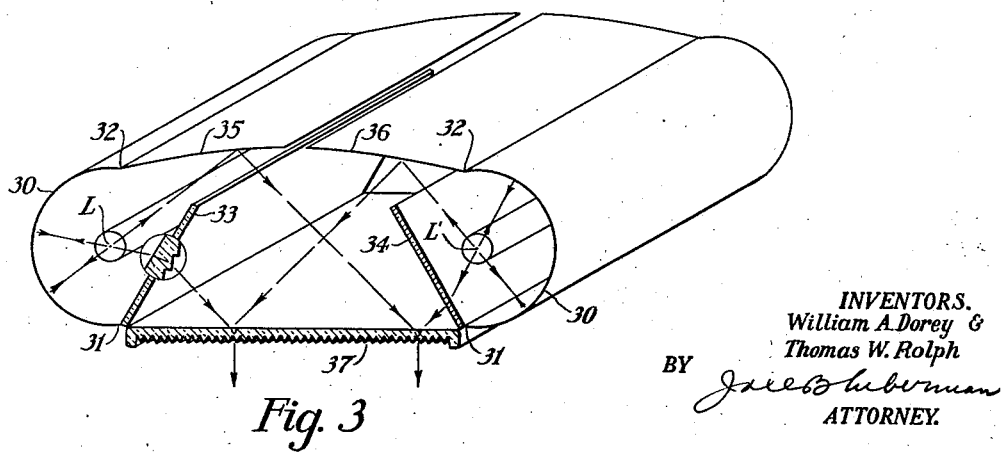
Fig. 3 is a transverse sectional view illustrating a light mixing apparatus employing two circular cylindrical reflectors with modified auxiliary parabolic reflecting surfaces and collecting lenses cooperating with the cylindrical reflectors and a light mixing plate.

In the form shown in Fig. 3, the projector or mixer is made up of two circular cylindrical reflectors 30 with centers of curvature at the light sources L and L'. The reflectors 30 have openings of approximately 180° from points 31 and 32. Flat or trough shaped prismatic lenses 33 and 34 receive the predominant rays of direct and reflected light from the lamps L and L' respectively, and by refraction, emit the light from the under sides in substantially flat, parallel beams. Light rays passing through the openings between points 32 and lenses 33 and 34 are redirected by parabolic reflectors 35 and 36 into a direction parallel to the rays from lenses 33 and 34. Prismatic glass mixing plate 37 intercepts the two unidirectional light beams from lens plates 33 and 34 and by refraction causes these rays to mix and emerge from the lower side in a common direction.

Figs. 5 and 6 show these two possible prism forms for the light mixing glass members 10, 25, or 37, adapted to act on these predominant rays and produce a mixed emitted beam having rays substantially parallel to the axis of the optical train. In Fig. 5, deviation of the two beams of unidirectional light rays is effected by internal reflection within prisms 50 on the upper surface. In Fig. 6, deviation is effected by refraction only, the prisms 60 being on the lower surface. These prismatic members may be flat, rectangular plates with longitudinal prisms, or long troughs. Where one desires to effect a change in the direction of the mixed beam, an auxiliary refracting plate 61 may be placed below the mixing plate.

Fig. 7 illustrates a possible form of diffusing or redirecting glass plate 70 for use in conjunction with the mixing plate when light distributions other than concentrating are required.

Fig. 8 shows a section of a mixing plate in which the reflecting prisms 80, are tipped uniformly in one direction, whereby the emerging beam of light is directed to one side of the axis of the complete device. Typical light rays are shown at 81 and 82. This construction is the same as Fig. 5 except for the tipping of the prisms. Similarly the prisms shown in Fig. 3 may be tipped, if desired. It is also possible to modify the direction of the emerging light in the construction in Fig. 5 by the use of prisms or flutes on the outer surface shown smooth in the figure.

The reflectors can be of any specular reflecting material, polished metal, etched polished metal, prismatic or silvered glass. Diffusing plate 70 may be etched, flashed, opal, ribbed or pebbled glass, or any other material suitable for diffusion.

Fig. 9 indicates a form of sky light construction employing a plurality of spaced light sources 90, of any of the above types, and preferably arranged parallel. Each light source is enclosed in rectilinear lenses 91 and 92 which may be the same as the lenses 33 and 34 of Fig. 3. These lenses are oblique to one another and the open space above the lenses is closed by a circular cylindrical reflector 93. The lenses 91 and 92 are arranged to produce crossed beams of light similar to those above described and these crossed beams of light fall on mixing plates 94, similar to the mixing plates above described.

The arrangement shown in Fig. 9 makes it possible to employ these long light sources in a concealed sky light construction in which the light distribution is controlled and is the same irrespective of whether all, or only part, of the light sources are opearted.

What is claimed is:

1. In combination, two spaced light sources with associated light projecting and directing means for producing two beams of light in each of which the dominant rays are substantially parallel, the planes of the dominant rays of both sources being parallel, the rays crossing in a certain region, and a prismatic light transmitting member placed in said region so that one face of the member receives substantially all the light from both beams, the transmitting member being composed of a multiplicity of prismatic elements each small as compared with the width of the member and each adapted to receive a narrow zone of each beam, the prismatic formation being such as to receive either beam of light or both crossing beams of light and form the same into an emergent beam, the rays of which have, irrespective of the source in which the light originated, a predetermined common direction.

2. In combination, two rectilinear, parallel light sources with associated rectilinear, parallel light projecting and directing means for producing two beams in each of which the dominant rays are substantially parallel and in planes normal to the source axis, the beams crossing in a certain rectangular region, and a prismatic light transmitting member placed in said region as that one face of the member receives substantially all said dominant light rays in both beams, the transmitting member being composed of a multiplicity of parallel prismatic elements at right angles to the planes of said dominant rays each element being small as compared with the width of the member each adapted to receive a narrow zone of each beam, the prismatic formation being such as to receive either beam of light or both crossing beams of light and form the same into an emergent beam, the rays of which have, irrespective of the source in which the light originated, a predetermined common direction.

3. In combination, two spaced light sources with associated light projecting and directing means for transmitting said light with the predominant rays of each beam in parallel planes and producing two beams of light which cross in a certain region, and a prismatic light transmitting member placed in said region so that one side receives substantially all the light from both beams, the transmitting member being composed of a multiplicity of prismatic elements at right angles to the planes of said dominant rays, each element being small as compared with the width of the member each adapted to receive a narrow zone of each beam, the prismatic formation being such that said predominant rays are transmitted in a single direction to produce a mixed beam.

4. In combination, two spaced light sources with associated light projecting and directing means for producing two beams of light which cross in a certain region, the predominant rays of each beam being in parallel planes, and a prismatic light transmitting member placed in said region so that one side receives substantially all the light from both beams, the transmitting member being composed of a multiplicity of prismatic elements at right angles to the planes of said dominant rays, each element being small as compared with the width of the member each adapted to receive a narrow zone of each beam, the prismatic formation thereof being symmetrical with respect to the respective crossing incident light beams and such that said predominant rays are transmitted in a single direction to produce a mixed beam with the predominant rays parallel to the axis of the optical train.

5. In combination, two parallel rectilinear light sources, a rectilinear lens adjacent each light source for concentrating light therefrom into a beam of substantially parallel rays and having the width and length of the lens, the axial planes of the lenses being oblique to one another and the lenses being spaced so that the light from each lens will be transmitted across the light from the other lens without interference by the other lens, and a light transmitting member oblique to both beams and of substantially the length of the lens and onto which the crossing light rays of both beams fall, the light transmitting member having longitudinal prisms through which the light is transmitted and combined into a mixed beam.

6. In combination, two parallel rectilinear light sources, a rectilinear reflector of circular cross section back of each light source, a rectilinear lens adjacent each light source for concentrating light from the source and reflector into a beam of substantially parallel rays, the axial planes of the lenses being oblique to one another so that the light from each lens will be transmitted across the light from the other lens without interference by the other lens, a light transmitting member onto which the crossing light rays fall, the light transmitting member having longitudinal prisms through which the light is transmitted and combined into a mixed beam, and a supplemental reflector adjacent each light source and receiving a wedge of light not acted on by the corresponding lens, the supplemental reflectors directing the reflected light onto the light transmitting member in rays substantially parallel with the rays emitted by the respective lenses.

7. In combination, two parallel rectilinear light sources, a rectilinear reflector of circular cross section back of each light source, a rectilinear lens adjacent each light source for concentrating light from the source and reflector into a beam of substantially parallel rays, the axial planes of the lenses being oblique to one another so that the light from each lens will be transmitted across the light from the other lens without interference by the other lens, and a light transmitting member onto which the crossing light rays fall, the light transmitting member having longitudinal prisms through which the light is transmitted and combined into a mixed beam.

8. In an artificial sky light construction, in combination, a plurality of parallel spaced light sources with associated light projecting and directing means for producing two beams of light in each of which the dominant rays are substantially parallel and in planes normal to the source axis; the beams crossing in regions between each of two adjacent light sources, and prismatic light transmitting members placed in each of said regions so that one face of each member receives light from the adjacent sources, the transmitting members being composed of a multiplicity of parallel prismatic elements at right angles to the planes of said dominant rays, each element being small as compared with the width of the members, each adapted to receive a narrow zone of each beam, the prismatic formation of each member being such as to receive either beam of light or both crossing beams of light and form the same into an emergent beam, the rays of which have, irrespective of the source in which they originated, a predetermined common direction.

9. The combination as claimed in claim 8, wherein the light projecting and directing means for each light source comprises two rectilinear lenses parallel with the light source and arranged in V-relation to one another, and a cylindrical reflector between the spaced edges of the lenses.

10. In a light mixing apparatus, in combination, two rectilinear optical systems parallel to one another, each having a rectilinear light source disposed along the longitudinal axis thereof, each system being adapted to produce a beam of light composed of substantially parallel rays projected at such an angle to the plane intersecting the longitudinal axial lines of the optical systems as to fall to one side of the opposite optical system and to cross where they intersect a plane parallel with the plane through said axial lines, and a light mixing and transmitting member of substantially the length of the optical systems for receiving said crossing rays of light and transmitting them from substantially its entire area in a single beam with controlled spread and angle in transverse planes.

11. A lighting apparatus as set forth in claim 10 wherein each of the optical systems includes a rectilinear lens on one side of the light source, and a circular cylindrical reflector back of the light source with its focus substantially coincident with the focus of the lens.

12. A lighting apparatus as claimed in claim 10 wherein each of the optical systems includes a cylindrical parabolic reflector with tilted longitudinal axis and focus at the corresponding light source.

13. Lighting apparatus comprising two parallel rectilinear light sources of unlike character, a prismatic member having prisms parallel with the light sources, and rectilinear means acting on the light from each light source to redirect it onto the entire width of the prismatic member so that it may receive light from either or both light sources, the transmitting member being composed of a multiplicity of prisms each small as compared with the width of the member, the prismatic formation being such that the light is emitted from the member in a predetermined direction irrespective of the source from which it came, whereby when either source is operated substantially the same light distribution is obtained from the prismatic member without substantial alteration of the character of the light from said source and whereby, with both sources operating, the light from the two sources is mixed.

14. Lighting apparatus comprising two parallel rectilinear light sources, one being an incandescent lamp, the other being a gaseous discharge tube of materially different spectral range than the incandescent lamp, a prismatic member having prisms parallel with the light sources, and rectilinear means acting on the light from each light source to redirect it onto the entire width of the prismatic member so that it may receive light from either or both light sources, the prismatic formation being such that the light is emitted from the member in a predetermined direction irrespective of the source from which it came, whereby when either source is operated substantially the same light distribution is obtained from the prismatic member without substantial alteration of the character of the light from said source and whereby, with both sources operating, the light from the two sources is mixed.

WILLIAM A. DOREY.
THOMAS W. ROLPH.